United States Patent
Moon et al.

(10) Patent No.: US 9,932,037 B2
(45) Date of Patent: Apr. 3, 2018

(54) METHOD OF CONTROLLING AUTOMOTIVE SMART CRUISE CONTROL SYSTEM

(71) Applicant: Hyundai Motor Company, Seoul (KR)

(72) Inventors: Seong Wook Moon, Seoul (KR); Jae Hoon Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/350,502

(22) Filed: Nov. 14, 2016

(65) Prior Publication Data

US 2018/0065628 A1 Mar. 8, 2018

(30) Foreign Application Priority Data

Sep. 5, 2016 (KR) ......................... 10-2016-0113743

(51) Int. Cl.
| | |
|---|---|
| *B60W 30/00* | (2006.01) |
| *B60W 30/14* | (2006.01) |
| *B60W 10/18* | (2012.01) |
| *B60W 10/04* | (2006.01) |
| *B60W 30/18* | (2012.01) |
| *B60W 30/02* | (2012.01) |

(52) U.S. Cl.
CPC .......... *B60W 30/146* (2013.01); *B60W 10/04* (2013.01); *B60W 10/18* (2013.01); *B60W 30/02* (2013.01); *B60W 30/18127* (2013.01); *B60W 2520/10* (2013.01); *B60W 2720/103* (2013.01)

(58) Field of Classification Search
CPC .... B60W 30/146; B60W 10/04; B60W 10/18; B60W 30/02; B60W 30/18127; B60W 2520/10; B60W 2720/103
USPC .............................................. 701/93, 70, 96
See application file for complete search history.

(56) References Cited

U.S. PATENT DOCUMENTS

| | | | | |
|---|---|---|---|---|
| 2010/0204896 | A1* | 8/2010 | Biondo ............... | B60W 30/143 701/93 |
| 2011/0246043 | A1* | 10/2011 | Maruyama ........... | B60W 30/17 701/96 |
| 2012/0078466 | A1* | 3/2012 | Natori ..................... | B60Q 1/52 701/36 |
| 2016/0257288 | A1* | 9/2016 | Miller ..................... | B60T 1/10 |
| 2016/0273467 | A1* | 9/2016 | Kawano ........... | F02M 35/10216 |
| 2016/0362105 | A1* | 12/2016 | Kwon .................. | B60W 30/14 |

FOREIGN PATENT DOCUMENTS

| | | |
|---|---|---|
| JP | 2014-236567 A | 12/2014 |
| KR | 2013-0142349 A | 12/2013 |

* cited by examiner

*Primary Examiner* — Marthe Y Marc-Coleman
(74) *Attorney, Agent, or Firm* — Mintz Levin Cohn Ferris Glovsky and Popeo, P.C.; Peter F. Corless

(57) ABSTRACT

A method of maintain an automotive smart cruise control system is provided. The system is capable of maintaining a vehicle in a stopped state without requiring an electronic braking system. The vehicle is stopped by a controller when conditions for stopping the vehicle are satisfied based on the driving situation of the vehicle, and the vehicle is maintained in the stopped state by setting the speed of the driving motor to zero.

6 Claims, 3 Drawing Sheets

US 9,932,037 B2

METHOD OF CONTROLLING AUTOMOTIVE SMART CRUISE CONTROL SYSTEM

CROSS REFERENCE TO RELATED APPLICATION

The present application claims priority to Korean Patent Application No. 10-2016-0113743, filed Sep. 5, 2016, the entire contents of which is incorporated herein for all purposes by this reference.

BACKGROUND

Field of the Disclosure

The present disclosure relates to a method of controlling an automotive smart cruise control system and, more particularly, to a method of controlling an automotive smart cruise control system that maintains a vehicle in a stopped state even without an electronic braking system.

Description of the Related Art

An automotive smart control system, which automatically adjusts the speed of a vehicle to allow the vehicle to automatically travel (cruise) at a speed within a desired range, continuously drives a vehicle at a desired speed, and thus, fuel efficiency and driver convenience are improved. However, according to this cruise control function, the vehicle may not be maintained in a stopped state (e.g., with a speed of 0) when the vehicle is stopped in accordance with the driving situation of the vehicle, thus requiring a brake pedal to remain engaged to stop the vehicle. Further, when a driver engages the brake pedal, the cruise control function is stopped, thus requiring the driver to engage the accelerator pedal to start the vehicle again. In other words, when the automotive smart control system is active, the engagement of a brake pedal releases the automatic cruise driving of the vehicle. Once the control is released, the brake pedal requires engagement to stop the vehicle and the accelerator pedal is required to be engaged to then continue driving the vehicle.

Meanwhile, a smart cruise control system is capable of maintaining a vehicle stopped by operating an electronic parking brake (EPB) after the vehicle is stopped. Accordingly, the cruise control function is maintained even after a vehicle is stopped, and thus, the vehicle is capable of being restarted (e.g., driven again) even without requiring the engagement of the accelerator pedal. However, the smart cruise control system requires the additional EPB to maintain the vehicle in a stopped state, thus significantly increasing the cost of manufacturing the vehicle.

The description provided above as a related art of the present disclosure is merely for helping understanding the background of the present disclosure and should not be construed as being included in the related art known by those skilled in the art.

SUMMARY

Accordingly, the present disclosure provides a method of controlling an automotive smart cruise control system that maintains a vehicle is a stopped state even without requiring an electronic braking system.

According to one aspect of the present disclosure, a method of controlling an automotive smart cruise control system may include: stopping, by a controller, a vehicle when conditions for stopping the vehicle are satisfied based on the driving situation of the vehicle while the vehicle is in a cruise control mode; and maintaining, by the controller, the vehicle stopped by setting the speed of a driving motor to zero when the vehicle is stopped.

Particularly, the vehicle may be stopped by regenerative braking when the vehicle speed is a predetermined speed or greater. Additionally, the vehicle may be stopped through electronic stability control (ESC) when the vehicle speed is less than the predetermined speed, and the ESC may be stopped and the vehicle may remain stopped. When conditions for starting the vehicle are satisfied based on the driving situation of the vehicle, the controller may be configured to start the vehicle by increasing the speed of the driving motor.

According to the present disclosure, since a vehicle is maintained in a stopped state by maintaining the speed of the vehicle at zero, it may be possible to achieve the unique smart cruise control function of a smart cruise control system even without requiring an electronic braking system, thereby increasing the price competitiveness of the vehicle. Further, since it may be possible to maintain the smart cruise control function even after a vehicle is stopped, the pedal operation is reduced, to thus allow the driver to drive the vehicle more conveniently.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Exemplary embodiments of the present disclosure will be described hereafter in detail with reference to the accompanying drawings.

Figure 2:
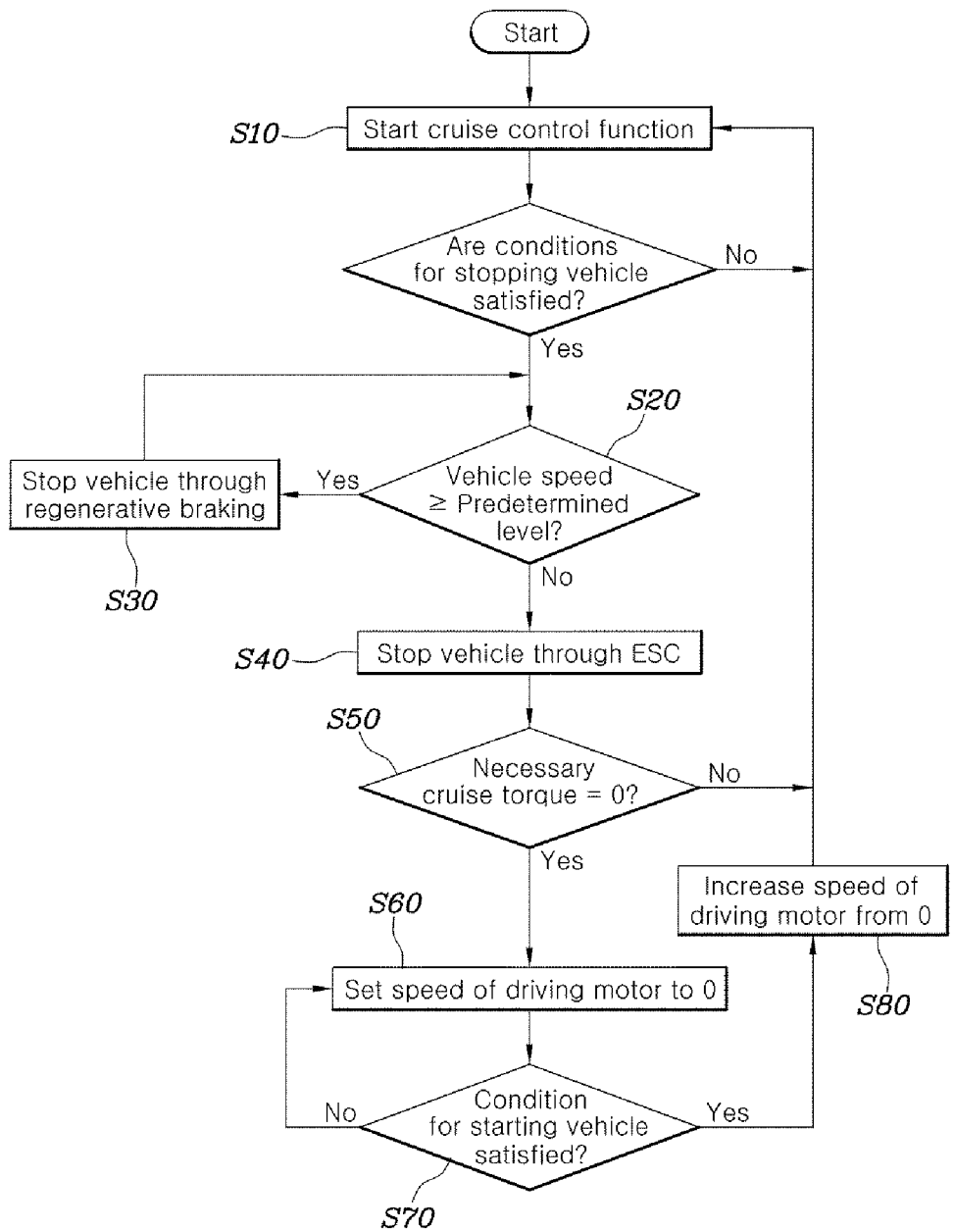
FIG. 2 is a flowchart illustrating a process of smart cruise control according to an exemplary embodiment of the present disclosure.
Figure 3:
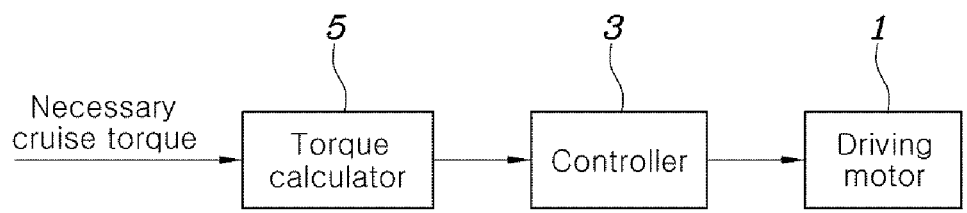
FIG. 3 is a diagram schematically showing a smart cruise control system according to an exemplary embodiment of the present disclosure.

A method of controlling an automotive smart cruise control system of the present disclosure may include a stop control step and a stop maintenance control step. Referring to FIGS. 2 and 3, which describe the present disclosure in detail, first, when the conditions for stopping the vehicle are satisfied based on the driving situation of the vehicle, a controller 3 may be configured to stop the vehicle or decrease the vehicle speed without user input.

For example, when a smart cruise control function is engaged (e.g., entry input or engaged received from a user input), the speed and the distance from a preceding vehicle may be measured using a radar sensor mounted on the front of a vehicle. Thus, the vehicle may be driven to maintain a predetermined distance from the preceding vehicle by appropriately adjusting the vehicle speed based on the measured information. When the speed of the vehicle is to be decreased (e.g., the vehicle is to be stopped), based on the distance from the preceding vehicle, a torque calculator 5 of the controller 3 may be configured to calculate the necessary reduction cruise torque for deceleration and the calculated necessary reduction cruise torque may be transmitted to the controller 3. The controller 3 may then be configured to stop the vehicle by operating the brake system to correspond to the reduction cruise torque, thereby decreasing the vehicle speed.

Figure 1:
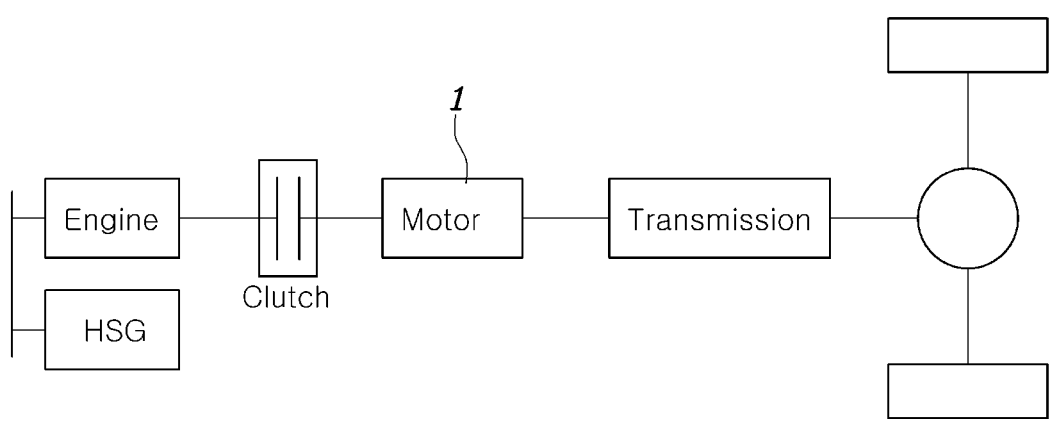
FIG. 1 is a diagram showing the structure of a powertrain for a hybrid vehicle to which the present disclosure can be applied according to an exemplary embodiment of the present disclosure.

Furthermore, once the vehicle is stopped (e.g., the vehicle speed is 0), the controller 3 may be configured to maintain the vehicle in the stopped state by setting the speed of the driving motor 1 to zero. For example, FIG. 1 shows an exemplary structure of a powertrain within a hybrid vehicle to which the present disclosure may be applied, in which HSG is an acronym of 'Hybrid Starter Generator'. In FIG. 3, when the speed of a driving motor 1 decreases to zero and the necessary cruise torque, calculated by the torque calculator 5, decreases to zero due to the deceleration of the vehicle, the speed of the driving motor 1 may also be maintained at zero.

According to this configuration, since the vehicle may be maintained in the stopped state by maintaining the speed of the driving motor 1 at zero, the vehicle is prevented from sliding backwards, for example, down an inclined road, even though a braking pedal remains disengaged (e.g., no pressure is exerted onto the pedal). Accordingly, it may be possible to achieve the particular smart cruise control function of a smart cruise control system even without the requirement of the electronic braking system, thus increasing the price competitiveness of the vehicle. Further, it may be possible to minimize the required user engagement of a pedal by maintaining the smart cruise control function even after a vehicle is stopped, and thus, user convenience may be improved.

Referring to FIGS. 2 and 3, in the stop control step of the present disclosure, it may be possible to stop a vehicle through regenerative braking when the current vehicle speed is a predetermined speed or greater. In other words, electricity is generated by regenerative braking while a vehicle is stopped, and the electric energy for operating the driving motor 1 is recovered, thereby improving the fuel efficiency of the vehicle. Further, in the stop control step of the present disclosure, when the current vehicle speed is less than a predetermined speed, the vehicle may be stopped through electronic stability control (ESC).

Further, after the stop control step, the ESC may be stopped while maintaining the vehicle is the stopped state. In other words, when the vehicle is being driven at a speed where regenerative braking is not possible to stop the vehicle, ESC may be initiated by the controller to stop the vehicle. Once the vehicle is stopped, the vehicle may remain in the stopped state by stopping ESC and reducing the speed of the driving motor 1 to zero.

Further, according to the present disclosure, when conditions for starting a vehicle are satisfied based on the driving situation of the vehicle after the stop maintenance control, the controller 3 may be configured to start the vehicle by increasing the speed of the driving motor 1 from zero. For example, when a vehicle is started and the distance from the preceding vehicle increases, the vehicle speed is required to be increased to thus maintain the desired cruise control. Accordingly, the torque calculator 5 may be configured to calculate the necessary acceleration cruise torque for starting and accelerating the vehicle and transmit the calculated necessary acceleration cruise torque to the controller 3. The controller 3 may then be configured to increase the speed of the driving motor 1 to a speed that corresponds to the necessary acceleration torque to thus accelerate the vehicle. In other words, by maintaining the smart cruise control function active even after a vehicle is stopped, it may be possible for a driver to start the vehicle even without operating the accelerator pedal, and accordingly, the convenience of the driver may be improved.

Hereinafter, a process of controlling a smart cruise control system according to the present disclosure is described. The process described herein below may be executed by a controller which may be an upper or overall controller of the system. Referring to FIG. 2, a smart cruise control function may first be started or engaged (S10), the vehicle speed may be detected by a sensor when a stop condition is satisfied while a vehicle is being driven (S20). When the vehicle speed is detected to be a predetermined speed or greater, the vehicle may be stopped by regenerative braking (S30), whereas, when the vehicle speed is less than the predetermined speed, the vehicle may be stopped by starting ESC (S40).

Thereafter, whether the necessary cruise torque is zero may be detected (S50), and when the necessary cruise torque is determined to be zero, the speed of the driving motor 1 may be maintained at zero, whereby the vehicle remains in a stopped state (S60). Thereafter, whether the necessary cruise torque has increased to greater than zero and whether the conditions for starting the vehicle are satisfied may be detected (S70), and when the conditions for starting are satisfied, the speed of the driving motor 1 may be increased (e.g., from zero) (S80) and the vehicle may be started or accelerated by the cruise control function (S10).

As described above, according to the present disclosure, since a vehicle may be maintained in a stopped state by maintaining the speed of the vehicle 1 at zero, it is possible to achieve the particular smart cruise control function of a smart cruise control system without requiring an additional electronic braking system, thereby increasing the price competitiveness of the vehicle. Further, since the smart cruise control function may be maintained active after the vehicle is stopped, the operation of an accelerator pedal by the driver is minimized, thus increasing driver convenience.

Although an exemplary embodiment of the present disclosure has been described for illustrative purposes, those skilled in the aft will appreciate that various modifications, additions and substitutions are possible, without departing from the scope and spirit of the disclosure as disclosed in the accompanying claims.

What is claimed is:

1. A method of controlling an automotive smart cruise control system, comprising:
   stopping, by a controller, a vehicle when a condition for stopping the vehicle is satisfied based on a driving situation of the vehicle while the vehicle is in a cruise control mode; and
   maintaining, by the controller, the vehicle stopped by setting a speed of a driving motor to zero when the vehicle is stopped,
   wherein the vehicle is stopped through electronic stability control (ESC) when the vehicle, speed is less than a predetermined speed, and the ESC is stopped and the vehicle remains stopped.

2. The method of claim 1, wherein the vehicle is stopped by regenerative braking when a vehicle speed is the predetermined speed or greater.

3. The method of claim 1, wherein when a condition for starting the vehicle is satisfied based on a driving situation of the vehicle, and the controller is configured to start the vehicle by increasing the speed of the driving motor from zero.

4. A method of controlling a smart cruise control system, comprising:
   engaging, by a controller, the smart cruise control system;
   detecting, by the controller, a speed of a vehicle when a stop condition is satisfied while the vehicle is being driven;
   stopping, by the controller, the vehicle based on the detected speed of the vehicle;
   detecting, by the controller, whether a necessary cruise torque is zero; and
   maintaining, by the controller, a speed of a driving motor at zero when the necessary cruise torque is detected to be zero to maintain the vehicle in a stopped state,
   wherein when the speed of the vehicle is detected to be less than a predetermined speed, the vehicle is stopped by starting an electronic stability control.

5. The method of claim 4, wherein when the speed of the vehicle is detected to be the predetermined speed or greater, the vehicle is stopped by regenerative braking.

6. The method of claim 4, further comprising:
   detecting, by the controller, whether the necessary cruise torque has increased to greater than zero and whether conditions for starting the vehicle are satisfied; and
   increasing, by the controller, the speed of the driving motor when the conditions for starting the vehicle are satisfied to accelerate the vehicle by a cruise control function.

* * * * *